United States Patent [19]
Otto

[11] 4,238,079

[45] Dec. 9, 1980

[54] CUTTING DEVICE OF A COMMINUTING APPARATUS

[75] Inventor: Friedrich Otto, Hameln, Fed. Rep. of Germany

[73] Assignee: A. Stephan & Soehne GmbH & Co., Hameln, Fed. Rep. of Germany

[21] Appl. No.: 42,060

[22] Filed: May 24, 1979

[30] Foreign Application Priority Data

May 27, 1978 [DE] Fed. Rep. of Germany ....... 2823245

[51] Int. Cl.³ .............................................. B02C 18/18
[52] U.S. Cl. ................................ 241/248; 241/257 R; 241/260
[58] Field of Search ............ 241/257 G, 257 R, 46 A, 241/248, 257 R, 260, 285 R, 197, 188

[56] References Cited

U.S. PATENT DOCUMENTS

| 646,249 | 3/1900 | Williams | 241/197 X |
| 3,429,350 | 2/1969 | Otto | 241/248 X |

FOREIGN PATENT DOCUMENTS 280832 4/1970 Austria ............................ 241/257 R

*Primary Examiner*—Mark Rosenbaum
*Attorney, Agent, or Firm*—Michael J. Striker

[57] ABSTRACT

A cutting device of an apparatus for comminuting food products has two cutting rings located concentrically to one another and rotatable relative to one another about a common axis, so that an annular slot is bounded therebetween. The cutting rings have a plurality of axially extending teeth formed between axially extending slots, and the teeth of at least one cutting ring carry cutting members of hard alloy. Each of the cutting members of this one cutting disc completely overlaps a front surface of a respective one of the teeth and has two axially extending edges facing toward the annular slot between the cutting rings. One of these edges is a cutting edge, whereas the other of these edges forms, together with the cutting edge of a circumferentially adjacent tooth, a cutting gap.

13 Claims, 6 Drawing Figures

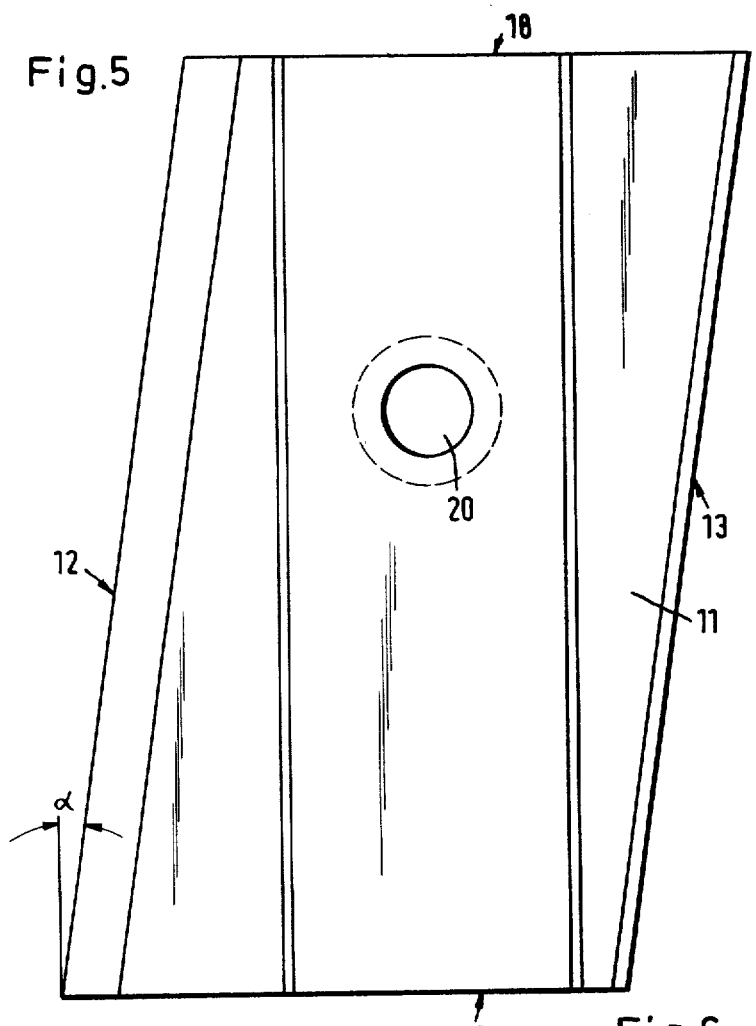
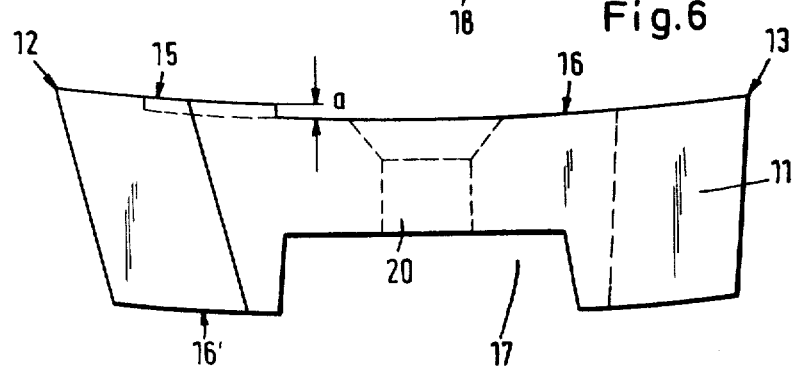

CUTTING DEVICE OF A COMMINUTING APPARATUS

BACKGROUND OF THE INVENTION

The present invention relates to a cutting device of an apparatus for comminuting food products.

Cutting devices of electric motor driven comminuting apparatuses are known in the art. A known cutting device has two cutting rings which are located concentric to one another and rotate relative to one another about a common axis. The cutting rings are provided with axially extending teeth which form an annular slot therebetween. The teeth of at least one of the rings have shaped cutting members which are constituted of hard alloy or the like material.

The construction and operation of one of such cutting devices are disclosed in the German Pat. No. 3,117,439. The cutting device has a cutting ring which is mounted on a shaft of an electric motor. Cutting edges are formed between slots which are provided in a wall of the cutting ring and extend parallel to one another with inclination to the axis of the ring. This cutting ring is overlapped by a second ring which is stationarily held in a housing of the machine and has a conical wall also provided with slots forming cutting edges.

Food products which are supplied into the comminuting apparatus are sucked by the fast rotating cutting ring acting as a pump and then are flung outwardly so that they travel through the inclined slots of the driven cutting ring into the slots between the cutting edges of the second ring. During movement from the first cutting ring to the second cutting ring, the food products are finely comminuted under the shearing action of the cutting edges by pulling cut.

In this construction, an additional cutting ring is inserted from above into the outer stationary cutting ring, so that the cutting edges of the former extend into intermediate spaces of the cutter of the outer cutting rings. The width of the through-going slot in the cutting ring can be adjusted within some limits by a respective rotational position between the outer cutting ring and the additional cutting ring inserted therein.

The Austrian Pat. No. 280,832 teaches a similar comminuting apparatus. The cutting rings are constituted by a corrosion-resistant material and are provided with shaped cutting members of hard alloy or another cemented cutting material. The shaped cutting members are glued in grooves which are arranged in slot edges of the cutting rings.

When one considers the face of the outer cutting ring in accordance with this patent, which face defines an annular slot between both cutting rings, the construction can be seen to have one straight cutting edge with a relatively small cutting surface, both formed by a shaped cutting member of hard alloy. It is followed by a small radially rearwardly offset guiding surface which is formed by a tooth which carries the shaped cutting member. After this a relatively large separating gap is located in which a tooth of an additionally inserted cutting ring engages. The guiding surface of this engaging tooth follows the actual cutting gap whose width is defined by the straight cutting edge of the next following cutting element. This construction possesses some disadvantages. The width of the cutting gap cannot be determined with sufficient accuracy. It is thereby difficult to provide the degree of comminuting which is required for each particular food product. In order to maintain the cutting gap sufficiently small, it is necessary, on manufacturing grounds, to insert an additional cutting ring into the stationary outer cutting ring so that the teeth of the additional cutting ring engage between the teeth of the outer cutting ring in a comb-like manner. The manufacture of such a cutting device is therefore relatively expensive. Since the additional cutting ring must be inserted into the outer cutting ring, the latter can have only a relatively small number of teeth and thereby can carry only a small number of cutting members. This is disadvantageous in the sense of the output of the comminuting arrangement. Moreover, due to the provision of the additional ring, a separating gap is necessarily formed between the teeth of both rings. This separating gap, however, is not needed for the cutting process and results in the disadvantage that in some cases fine but relatively long-grained material falls into the finished product.

It has been recognized from practical application that erosion takes place in the region of the teeth which define the annular slot between both cutting rings and are not shielded by the hard alloy edges. This erosion considerably reduces the service life of the cutting rings.

SUMMARY OF THE INVENTION

Accordingly, it is an object of the present invention to provide a cutting device of an apparatus for comminuting food products, which avoids the disadvantages of the prior art.

More particularly, it is an object of the present invention to provide a cutting device which has a simpler construction and increased output and service life, as compared with known cutting devices.

In keeping with these objects and with others which will become apparent hereinafter, one feature of the present invention resides, briefly stated, in a cutting device in which shaped cutting members on the teeth of at least one of the cutting rings are plate-like, and each shaped cutting member completely overlaps a front surface of a respective one of the teeth and has two axially extending edges facing toward and annular slot between the cutting rings of which one edge is formed as a cutting edge, and the other edge forms, together with the cutting edge of a circumferentially adjacent tooth, a cutting gap.

In such a construction the entire surface which defines, at one side, the annular gap between two cutting rings, is constituted of hard alloy. Erosion of the teeth which carry the shaped cutting members is no longer possible. The new plate-like shaped cutting members can be manufactured with high accuracy and they overlap the teeth at both their sides, as considered in the circumferential direction. For this reason, it is possible to form the cutting gap between two shaped cutting members. Thereby, the width of the cutting gap can be very accurately determined so that the intended degree of fineness of the finished products can be attained. Simultaneously, it is no longer necessary to provide an additional ring insertable into the outer cutting ring. As a result of this, the number of teeth of the cutting rings and thereby the number of the cutting members can be increased at least three times, without weakening of the cutting rings. This increases the number of cuts per time unit and thereby increases the output of the cutting device and positively influences the fineness of the products to be comminuted. Since the inventive device does not have an additional cutting ring, there is no separating gap which was formed in the known devices and was superfluous for the cutting purposes. As a result of this, fine but long-grained material does not fall into the finished product.

In accordance with a further advantageous feature of the present invention, both axially extending edges of each shaped cutting member may be parallel to one another and inclined relative to the cutting direction of the other cutting ring. Thereby, a short and accurate shear-like cut is made, especially when the cutting edges or the cutting gaps of the inner cutting ring are inclined in the direction of rotation.

It is advantageous when the face of the cutting members which define the annular slot between the cutting rings, has a circular contour corresponding to the curvature of the annular gap and includes a cutting portion and a guiding portion which is located radially behind the cutting portion.

The cutting members may be mounted on the teeth of the cutting ring by insertion of each tooth into a groove of the cutting member, which groove extends normal to and is open at axial end faces of the cutting member. The grooves may be slightly conical. The shaped cutting members may be fixed to the teeth by gluing and/or riveting.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is an enlarged rear view of a shaped cutting member in accordance with the invention; and FIG. 6 is a plan view of the shaped cutting member shown in FIG. 5.

DESCRIPTION OF A PREFERRED EMBODIMENT

Figure 1:
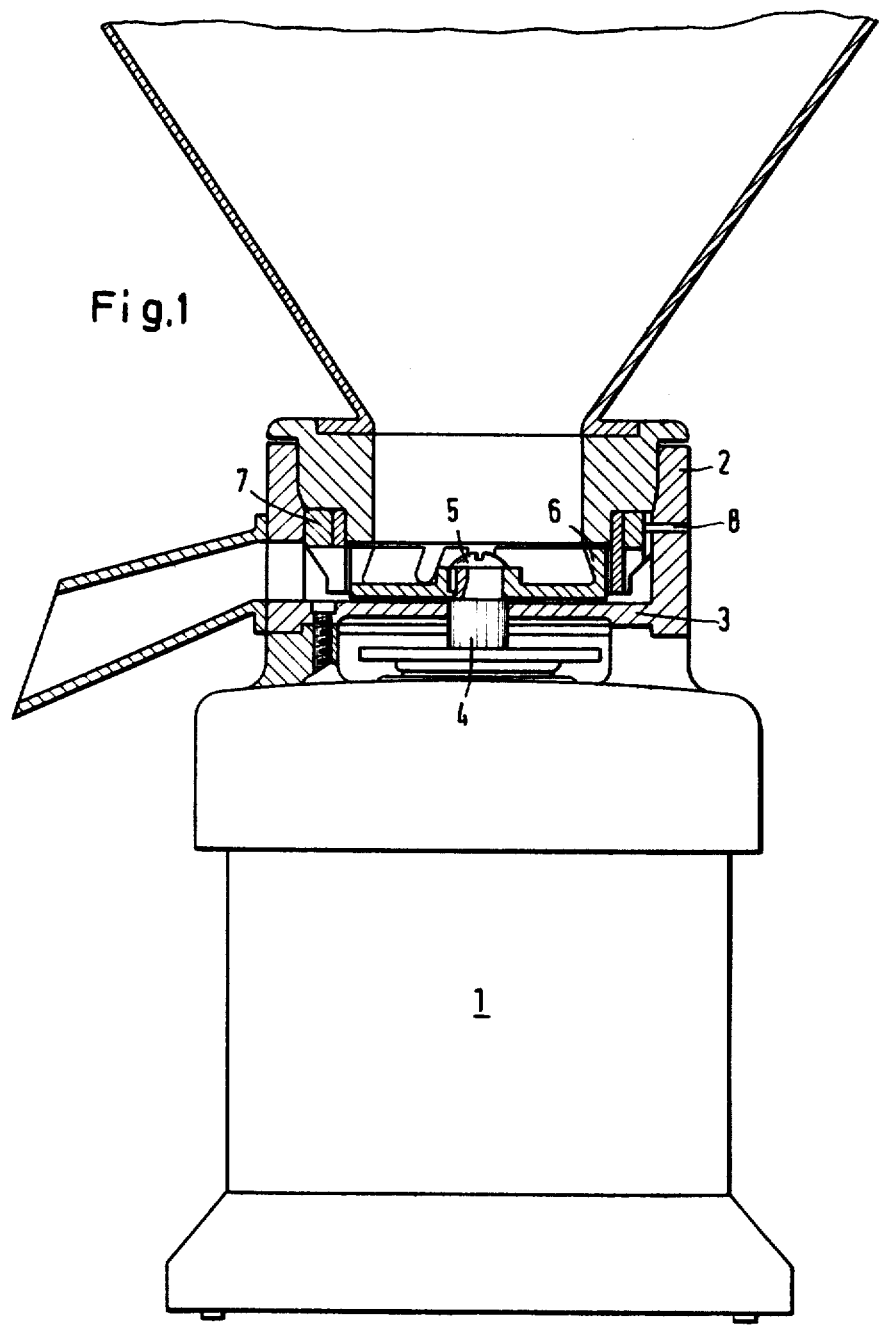
FIG. 1 is a view showing a longitudinal section of a comminuting apparatus disclosed in the prior art, with a cutting device composed of two cutting rings which are located concentrically and rotate relative to one another.

FIG. 1 shows a comminuting apparatus which has a housing 2 mounted on an electric motor 1. A vertical shaft 4 of the electric motor 1 extends through a bottom 3 of the housing 2. An inner cutting ring 6 is mounted on the shaft 4 by a screw 5. The inner cutting ring 6 is overlapped by an outer cutting ring 7 which is located concentrically with the inner cutting ring 6. The outer cutting ring 7 is fixed against rotation relative to the housing 2 by a pin 8. The inner cutting ring 6 rotates relative to the outer cutting ring 7. The above described comminuting apparatus relates to the prior art.

Figure 2:
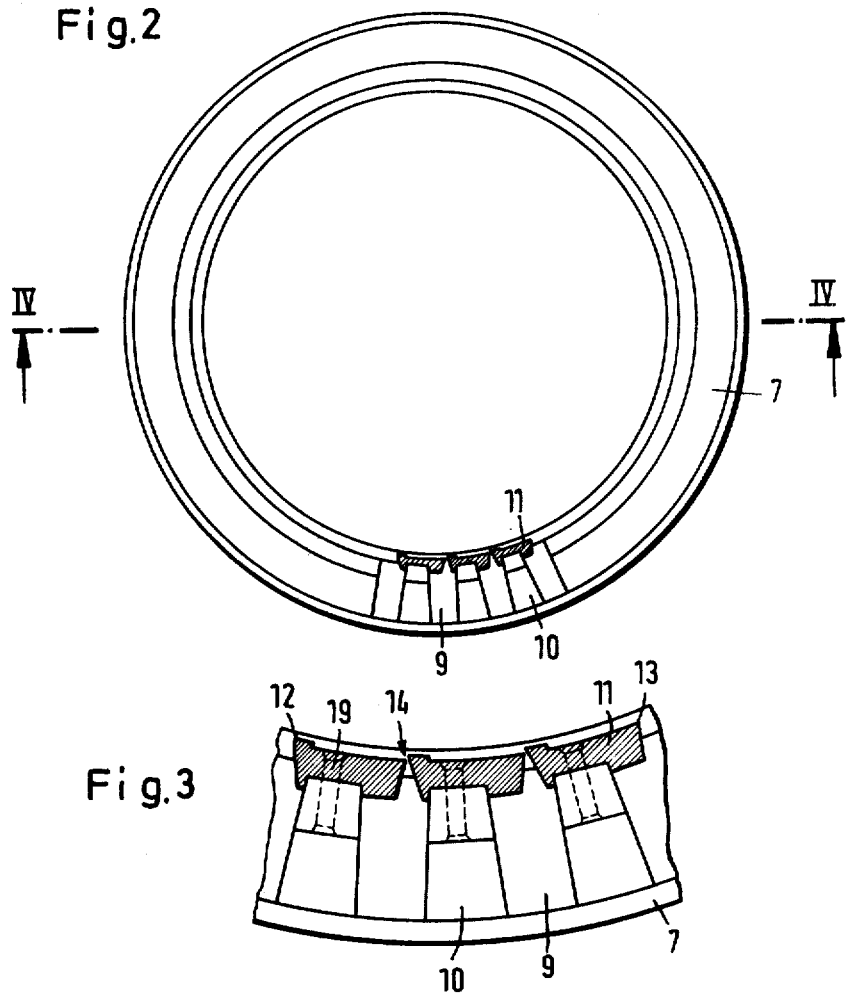
FIG. 2 is an enlarged and partially sectioned plan view of a cutting ring of a cutting device in accordance with the present invention.
Figure 3:
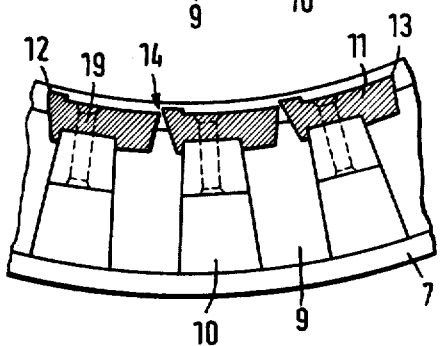
FIG. 3 is a view showing a fragment of the section taken along the line III—III in FIG. 2.
Figure 4:
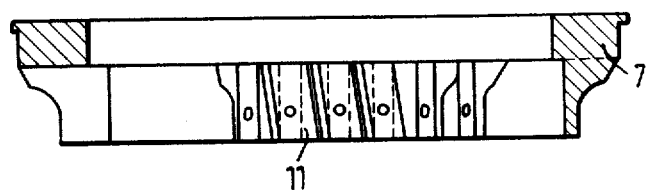
FIG. 4 is a view showing a section taken along the line IV—IV in FIG. 2.

FIGS. 2–4 show an outer cutting ring in accordance with the present invention. The outer cutting ring has a plurality of axially extending teeth 10 which are formed between axially extending slots 9. Plate-like shaped cutting members 11 of hard alloy are mounted on the teeth 10. As can be seen from FIGS. 2 and 3, each shaped cutting member 11 completely overlaps a radially inner surface of a tooth on which this shaped cutting member is mounted. The above mentioned surfaces define an annular slot between the inner cutting ring 6 and the outer cutting ring 7.

Each shaped cutting member 11 has two axially extending edges which face toward the annular slot and are spaced from one another in a circumferential direction. One of these edges is formed as a cutting edge 12, as can be seen particularly from FIGS. 5 and 6. The other of these cutting edges which is identified by reference numeral 13 forms, together with the cutting edge 12 of the shaped cutting member mounted on the circumferentially adjacent tooth, a cutting gap 14, as can be seen from FIG. 3.

FIG. 5 clearly shows that both edges 12 and 13 of each shaped cutting member 11 are parallel to one another and inclined by an angle $\alpha$ relative to the cutting direction of the inner ring 6. Advantageously, the angle $\alpha$ is equal substantially to 7°. The rear view of the shaped cutting member shows that it is parallelogram-like.

A face of the shaped cutting member, which defines the annular slot between the cutting rings 6 and 7, is circular and has a curvature corresponding to the curvature of the annular slot. This face includes a relatively small cutting face 15 and a guiding face 16. The guiding face 16 is located behind the cutting face 15, as considered in the radial direction, and is offset relative to the cutting face by a distance a.

Each shaped cutting member 11 has a rear face 16' in which a groove 17 is provided. The groove 17 extends normal to axial end faces 18 of the shaped cutting member 11 and are open at the latter. The grooves have a slightly conical cross section. During the manufacture of the outer cutting ring 7, the shaped cutting members 11 with the grooves 17 are fitted onto the respective teeth 10 and thereafter are fixed to the latter by glueing and/or riveting.

As can be seen from FIG. 4, the teeth 10 may extend in the axial direction and thereby may be easily manufactured. The intended inclination of the cutting edge 12 by the angle $\alpha$ is attained exclusively by the shaped cutting members 11.

Each shaped cutting member has a through-going opening 20 provided with a countersink portion, as shown in FIGS. 5 and 6. Rivets 19 can be received into the openings 20 for mounting purposes.

The inventive cutting device includes the outer cutting ring constructed in accordance with the present invention as shown in FIGS. 2–6, and can otherwise be identical with the prior art cutting device shown in FIG. 1.

The inventive cutting device can be utilized not only in vertically operated machines, but also in horizontally operated machines.

It will be understood that each of the elements described above, or two or more together, may also find a useful application in other types of constructions differing from the types described above.

While the invention has been illustrated and described as embodied in a cutting device for a comminuting apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutting device of an apparatus for comminuting food products, comprising
   two rings located concentrically with and rotatable relative to one another about a common axis, said rings bounding an annular slot therebetween;
   a first plurality of axially extending teeth provided on one of said rings and spaced from one another in a circumferential direction, and a second plurality of axially extending teeth provided on the other of said rings and also spaced from one another in the circumferential direction, the teeth of said one ring and the teeth of said other ring having surfaces which face toward said annular slot; and
   a plurality of shaped cutting members provided on the teeth of at least one of said rings, each of said cutting members being plate-like and completely overlapping the surface of a respective one of said teeth of said one ring, each of said cutting members having two axially extending edges facing toward said annular slot and spaced from one another in the circumferential direction, one of said edges of each of said cutting members being formed as a cutting edge, whereas the other of said edges of the cutting member is extended from said cutting edge and spaced from the cutting edge of the cutting member provided on a circumferentially adjacent one of said teeth such a predetermined distance as to define a relatively small cutting gap therebetween.

2. A cutting device as defined in claim 1, wherein the comminuting apparatus has an electric motor, said one ring being driven in rotation by the electric motor.

3. A cutting device as defined in claim 1, wherein the other of said rings has a predetermined cutting direction, said one and other edges of each of said cutting members extending parallel to one another and at an angle to the cutting direction of said other ring.

4. A cutting device as defined in claim 1, wherein said annular slot has a predetermined curvature, each of said cutting members having a circular front face which is defined between said one and other edges of the same cutting member and has a curvature corresponding to the curvature of said annular slot.

5. A cutting device as defined in claim 4, wherein said annular front face of each of said cutting members has a smaller cutting portion which is located adjacent to said cutting edge, and a greater guiding portion which is located adjacent to said other edge and radially behind said cutting portion.

6. A cutting device as defined in claim 1, wherein each of said cutting members has a rear face which faces away from said annular slot and is provided with a groove, each of said teeth of said one ring engaging in the groove of a respective one of said cutting members.

7. A cutting device as defined in claim 6, wherein each of said cutting members has two end faces which are spaced from one another in an axial direction, the groove of each of said cutting members extending normal to and being open at the end faces of the same cutting member.

8. A cutting device as defined in claim 6, wherein each of said grooves has a slightly conical cross section.

9. A cutting device as defined in claim 1, wherein each of said cutting members is fixedly connected with a respective one of said teeth of said one ring; and further comprising means for connecting said cutting members with said teeth of said one ring.

10. A cutting device as defined in claim 9, wherein said connecting means includes layers of glue.

11. A cutting device as defined in claim 9, wherein said connecting means includes rivets.

12. A cutting device as defined in claim 9, wherein said connecting means includes layers of glue and rivets.

13. A cutting device as defined in claim 1, wherein said cutting members being constituted of hard alloy.

* * * * *